July 4, 1933.  L. JACOBY  1,917,036
FOOT THROTTLE FOR MOTOR VEHICLES
Filed Aug. 25, 1932  3 Sheets-Sheet 1
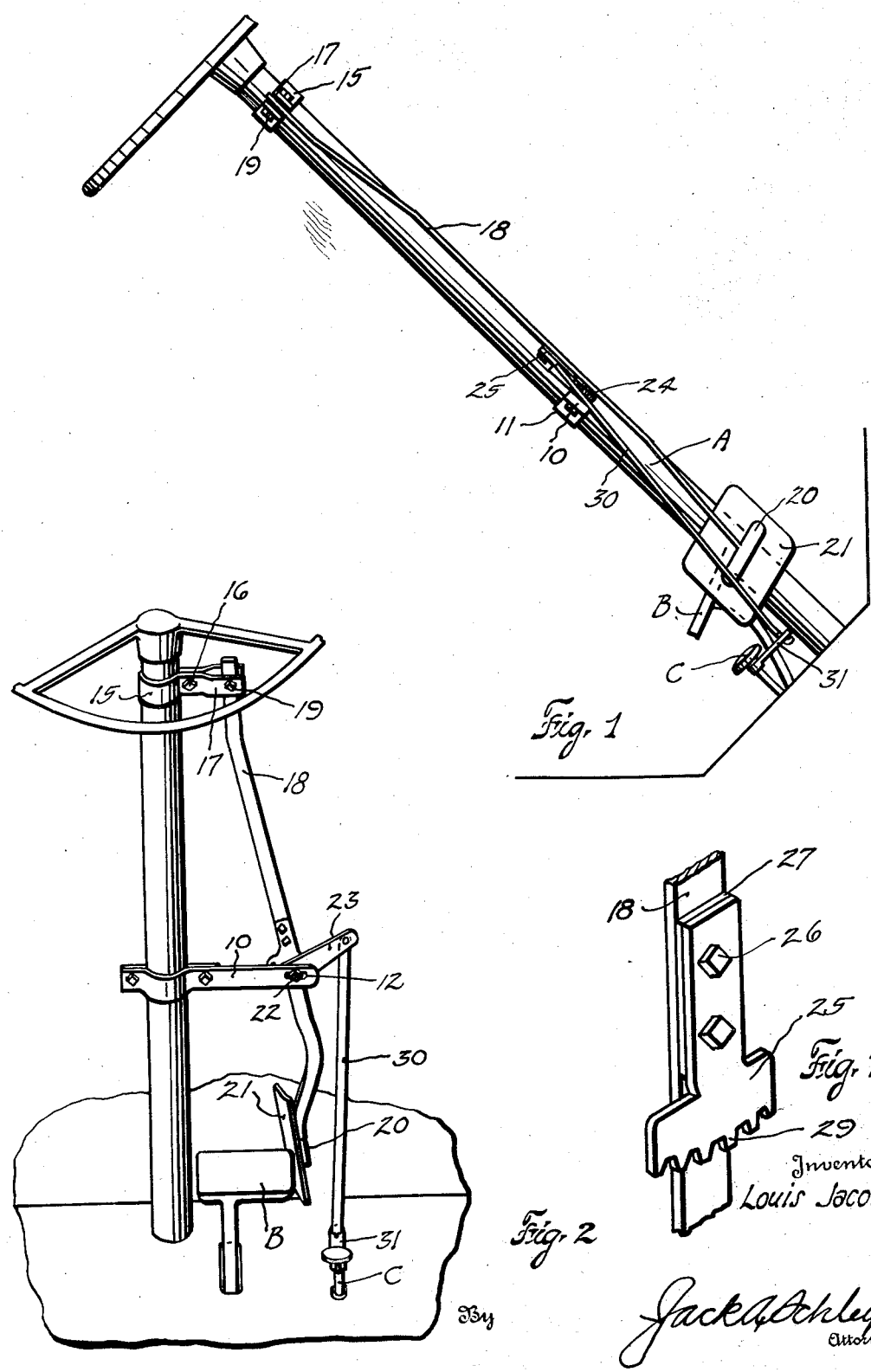
Inventor
Louis Jacoby
By Jack A. Ashley
Attorney July 4, 1933. L. JACOBY 1,917,036
FOOT THROTTLE FOR MOTOR VEHICLES
Filed Aug. 25, 1932 3 Sheets-Sheet 2
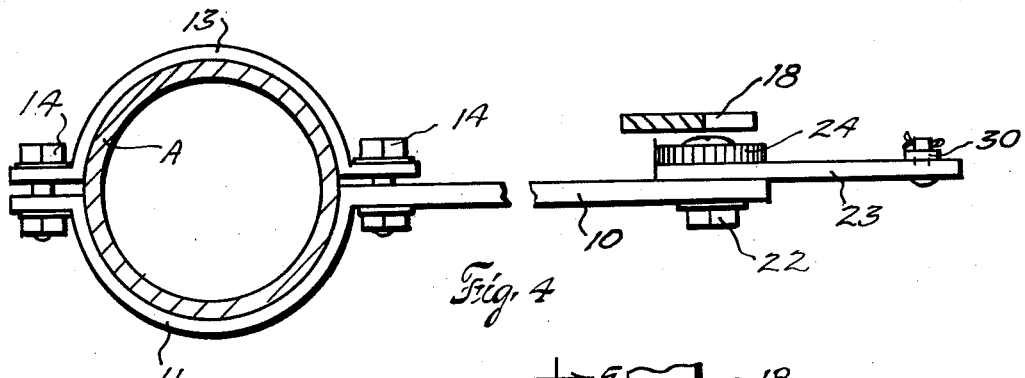
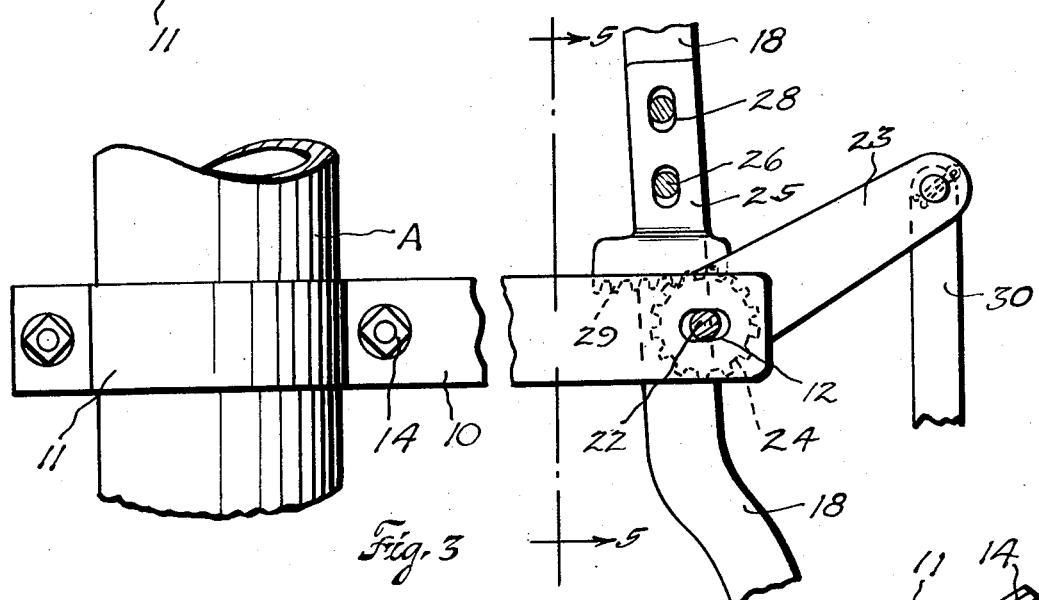
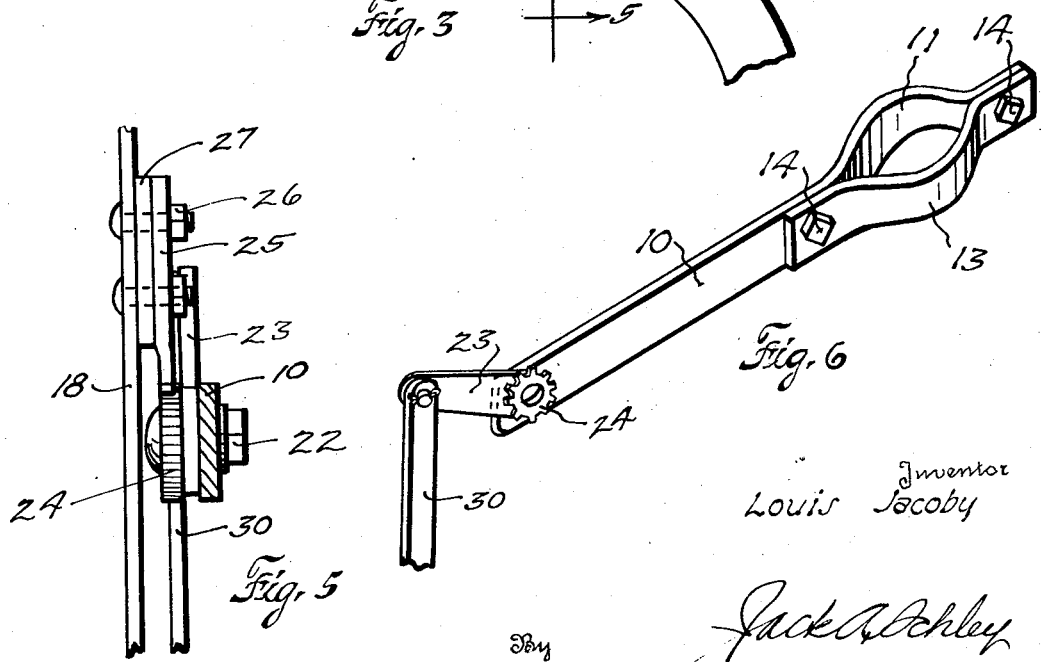
Inventor
Louis Jacoby
By Jack A. Ochley
Attorney July 4, 1933.  L. JACOBY  1,917,036
FOOT THROTTLE FOR MOTOR VEHICLES
Filed Aug. 25, 1932   3 Sheets-Sheet 3
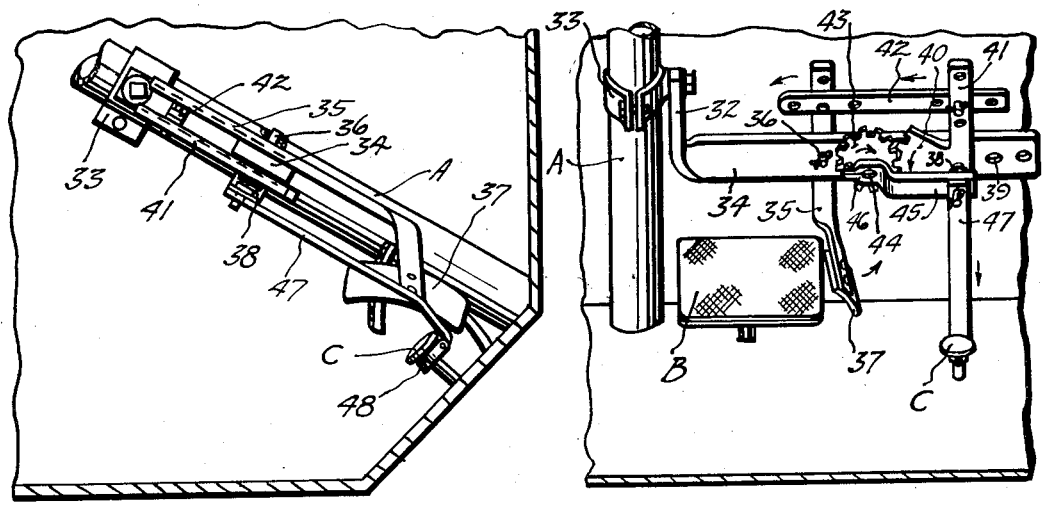
Fig. 8   Fig. 9
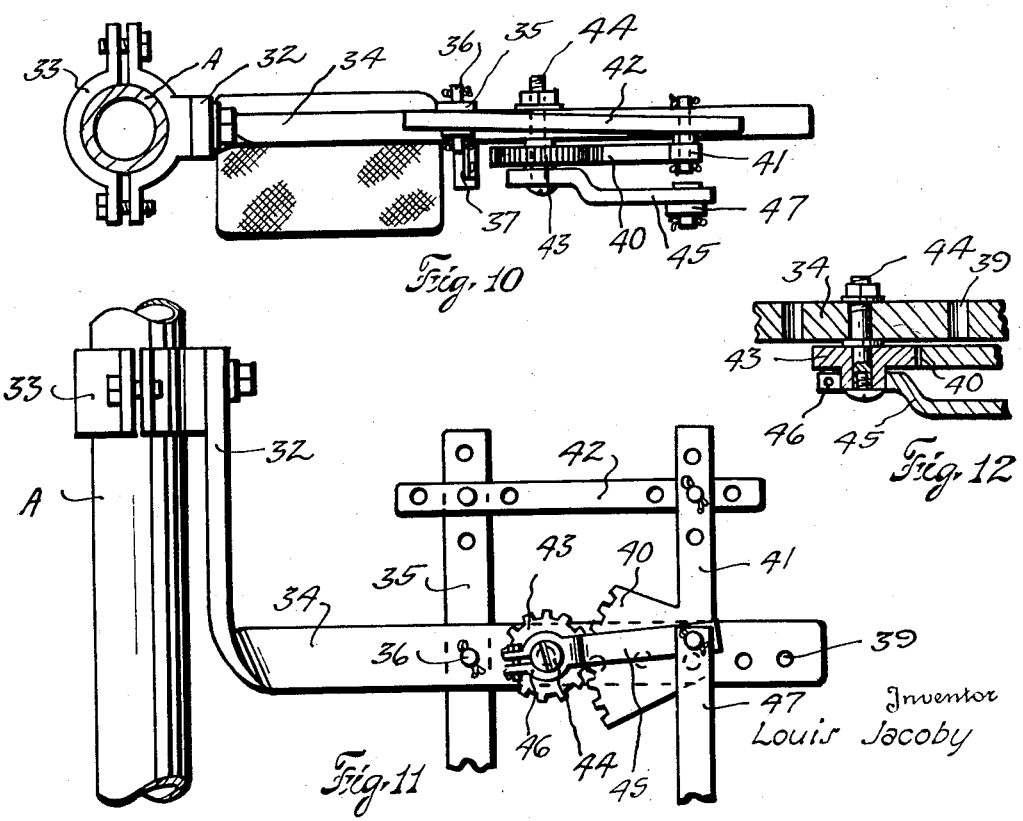
Fig. 10   Fig. 12
Fig. 11
Inventor
Louis Jacoby
By Jack A. Ashley
Attorney Patented July 4, 1933

1,917,036

UNITED STATES PATENT OFFICE

LOUIS JACOBY, OF DALLAS, TEXAS

FOOT THROTTLE FOR MOTOR VEHICLES

Application filed August 25, 1932. Serial No. 630,329.

This invention relates to new and useful improvements in foot throttles for motor vehicles.

One object of the invention is to provide an improved foot throttle arranged to be mounted with its operating shoe at one end of a brake pedal, whereby the driver, while resting his foot on the brake pedal, may operate the throttle by a very slight lateral or shifting movement of his foot, and may instantly depress the pedal to apply the brakes, without changing the position of his foot on said pedal.

A particular object of the invention is to provide a throttle which will be entirely free from connection with the brake pedal so as to permit unhampered operation of the latter, but located in such close proximity to said pedal that the driver will not be compelled to shift his foot laterally such a distance that a substantial part of his foot will be off the pedal, thereby impairing efficient operation of said pedal and the brakes.

An important object of the invention is to provide a throttle having an operating shoe, so inclined and located as not to interfere with the quick and free placement on, or withdrawal from, the brake pedal of the driver's foot; and particularly so that upon depression of the pedal said shoe is retracted and the throttle automatically closed, and upon release of pressure thereon the return of the pedal will automatically open the throttle.

Another important object of the invention is to provide a foot throttle having an operating shoe and a throttle actuating member, with means therebetween for amplifying the movement imparted to the shoe, whereby a slight shifting of the driver's foot on the brake pedal and a consequently limited displacement of the shoe will provide ample movement of the actuating member to fully operate the throttle; and also whereby sufficient leverage will be available to make for a reduction in resistance and a resultant easy operation.

A particular object of the invention is to provide a foot throttle, wherein the operating lever or member is pivoted above the brake pedal and carries a shoe to be operated by the driver's foot while resting upon said pedal, so that said lever may be operated at all stages of the depression of said pedal and also whereby the ease of operation will be increased as the depression of the pedal progresses.

A further object of the invention is to provide a foot throttle so arranged that it may be produced in the form of an attachment, thus lending itself to installation in vehicles without alteration of the latter.

A construction designed to carry out the invention will be hereinafter described together with other features of the invention.

The invention will be more readily understood from a reading of the following specification and by reference to the accompanying drawings in which an example of the invention is shown, and wherein:

Figure 1 is a side elevation showing a foot throttle constructed in accordance with the invention, attached to the steering post and foot accelerator and having its shoe at one end of the brake pedal, Figure 2 is a front elevation of the same, Figure 3 is a detail of the fulcrum bracket and gearing, Figure 4 is a plan view of the same, Figure 5 is a vertical sectional view taken on the line 5—5 of Figure 3.

Figure 6 is a perspective view showing the rear sides of the bracket and gearing, Figure 7 is a detail of the gear rack, Figure 8 is a vertical sectional view of the forward end of the body of a motor vehicle showing another form of the invention mounted on the steering column and connected with the foot throttle, Figure 9 is an elevation of the same, Figure 10 is a plan view of the attachment, Figure 11 is an enlarged elevation of the attachment, and Figure 12 is a detail of the pinion and arm mounting.

This application is filed as a continuation in part of my co-pending application Serial No. 519,464, filed March 2, 1931.

In the drawings the numeral 10 designates a fulcrum bracket having a clamp member 11 at one end and a slot 12 at its opposite end. The clamp member is shaped to fit the steering post A of a motor vehicle and to co-act with a clamp keeper 13 surrounding said post and secured to the bracket by bolts 14. By this structure the bracket may be clamped on posts of different diameters and at the desired location.

A split hanger clamp 15 is secured around the post A at the upper portion thereof by a bolt 16. The clamp is provided with outwardly extending arms 17. An elongated lever 18 has its upper end pivoted between the arms 17 on a bolt 19. This lever is offset so as to extend down in front of the slot 12 of the bracket 10 (the term "front" having relation to the front end of the motor vehicle). The lever 18 is provided at its lower end with an integral crossbar or bracket 20, which is suitably fastened as by welding, riveting, or the like, to the rear side of a throttle plate or shoe 21.

By observing Figures 1 and 2, it will be seen that the lever 18 is disposed forwardly of the brake pedal B and that the major portion of the shoe lies in front of said pedal. However, the rear portion of the shoe is at one end of the brake pedal and it is to be particularly noted that the shoe is placed in such close proximity to the pedal that the foot of the driver may be engaged with the face of said shoe when resting upon the brake pedal. The shoe is curved transversely and extends above and below the brake pedal.

The lower end of the lever 18 is bent so as to not only hold the shoe 21 in proper relation to the pedal, but so that the shoe may be given a downward inclination away from the pedal. By this arrangement the lever will be permitted to swing toward the pedal when the driver depresses the same, because said inclination will permit the lever to swing toward the pedal while the shoe remains in contact with the foot of the driver. This is one of the important features of the invention and assures automatic closing of the throttle when the driver depresses the brake pedal to apply the brakes.

A pivot stud 22 is adjustably fastened in the slot 12 of the bracket 10. An arm 23 is rotatably confined on the stud against the front side of the bracket. A pinion 24 is made integral with or is fastened to the arm so as to rotate around said stud and is spaced from the lever 18. The lever carries a T-shaped segmental rack bar 25 secured thereto by bolts 26 and spaced therefrom by a shim 27. The bar has vertical slots 28 so that its teeth 29 may be adjusted with relation to the teeth of the pinion 24, which they engage. Referring to Figures 2 and 3, it will be obvious that when the lever 18 is swung to the right, the teeth 29 of the rack bar 25 will rotate the pinion 24 in a clockwise direction, whereby the arm 23 will be swung downwardly.

The upper end of a vertical pitman 30 is pivoted to the outer end of the arm 23 and the lower end of the pitman is pivoted to a clamp 31 secured to the shank of the accelerator C. When the arm 23 is swung downwardly the pitman 30 will depress the accelerator and thus open the throttle in the same manner as if the accelerator had been depressed in the usual way.

It will be noted that the radius of the arc through which the segmental rack bar 25 swings is several times greater than the radius of the pinion 24, and thus a very slight swing of the lever 18 will cause an amplified swing of the arm 23. This structure is advantageous and has two functions. First, the extreme length of the lever 18 and its advantage in leverage permits the shoe 21 to be displaced with a minimum effort, and, second, a slight movement of the shoe produces an amplified movement of the pitman 30 and a like depression of the throttle C. It is not necessary for the driver to remove his foot from the brake pedal to operate the throttle. He merely has to shift or swing his foot to the right (Figure 2), so as to impart a slight lateral movement to the shoe 21, whereby the lever 18 will be swung and such slight movement will be amplified in the swinging of the arm 23, whereby the throttle C will be proportionately depressed.

In using the device, the driver keeps his foot constantly on the pedal B. In this position the ball of the foot will be over the pedal and the toe portion will project forwardly of the pedal. The side of the foot between the ball and the toe portion will be in contact with the shoe 21. Thus, by a slight shifting or rocking movement of the foot, the shoe may be easily swung to the right (Figure 2). The necessary movement will be so slight that it will not be necessary for the driver to shift his foot from the brake pedal.

Owing to the downward inclination of the shoe, the spring (not shown) of the throttle will actuate the parts so that the face of the shoe will constantly remain in contact with the foot of the driver when the brake pedal is depressed, thereby swinging the lever 18 to the left (Figure 2), which will reverse the travel of the arm and pitman and automatically close the throttle. This is a safety feature and permits instant application of the brakes without moving or changing the position of the driver's foot and at the same time automatically closing the throttle.

When the brake pedal is fully depressed to apply the brakes and the throttle closed, the inclined face of the shoe 21 will overhang the driver's foot and consequently when pressure on the pedal is released and the brake spring returns the pedal with the driver's foot thereon, the shoe will be shifted to the right, owing to its inclination, thereby opening the throttle automatically and without any additional effort on the part of the driver. Should the driver, upon depressing the pedal, decide that the motor should be speeded up rather than to apply the brakes, he has only to release the pressure on the brake pedal to increase the speed of his vehicle. This is possible because of the juxtaposition of the shoe to the brake pedal.

In Figures 8 to 12 I have shown another form of my invention. An angular bracket 32 having a split clamp 33 at its upper end is adapted to be secured around the steering column A of a motor vehicle. The bracket has a laterally extending arm 34 on which a foot lever 35 is pivoted. The lever is pivoted intermediate its ends upon a stud 36 and occupies an upright position.

This lever is bent at its lower end, as is best shown in Figures 8 and 9, and has a foot piece or shoe 37 secured on its lower end. The shoe 37 is supported adjacent the right hand end of the brake pedal B and is curved so as to maintain its relation to the end of the pedal when said pedal is depressed. One of the features is that the shoe is inclined downwardly and away from the pedal so that if the foot of the operator is engaged with the shoe and the pedal is depressed, the operator's foot will have a tendency to withdraw from the shoe, as will be hereinafter explained.

A pivot pin 38 is mounted in one of the holes 39 of the arm 34, according to the adjustment of the parts. A segmental gear 40 is journaled on the pin 38 and has an upwardly extending lever arm 41. A link 42 has adjustable pivotal connection with the upper end of the lever 35 and the upper end of the arm 41. It will be seen that when the lever 35 is swung the arm 41 will likewise be swung, thus partially rotating the gear 40.

A pinion 43 is journaled on a stud 44 which is engaged in one of the openings 39 so that said pinion will mesh with the gear 40. A lever 45 has a split collar 46 clamped around the hub of the pinion 43, as is shown in detail in Figures 11 and 12. The lever 45 is bent outwardly and is pivoted to the upper end of a link 47. The link 47 carries a clamping collar 48 at its lower end adapted to engage around the stem of the usual accelerator plunger C.

It will be seen that this device can be attached to almost any motor vehicle and by making suitable adjustments the parts can be brought into proper position. It will be possible to change the link 47 or position the collar 48 to suit different conditions and also to adjust the mountings 38 and 44 as well as the link 42 so as to bring the shoe into proper relation with the brake pedal B. It is to be understood that the proportions of the gears and the general arrangement is subject to modification.

In using the device the driver may either place his foot on the plunger C and operate the throttle in the usual manner or he may use the attachment, in which case he will drive with his foot resting upon the brake pedal B and if necessary the spring holding the brake pedal may be placed under sufficient tension that the mere weight of the foot will not depress such pedal. In order to open the throttle, the driver twists or turns his foot to the right, thus engaging the shoe 37. Pressure against the shoe 37 swings the lever 35 in the direction of the arrows shown in Figure 9. The greater the pressure against the shoe, the more the lever is swung. When the lever is swung by the shoe 37 its upper end is shifted to the left, which causes the arm 41 to be likewise swung, whereby the gear 40 is swung downward, which rotates the pinion 43 in a clockwise direction (Figure 9).

The pinion 43 when rotated will swing the arm 45 downwardly, thus pushing the link 47 downwardly. The link 47 will depress the plunger C, thus opening the throttle. By reason of the leverage gain and the arrangement of the parts, it is obvious that a slight movement of the shoe 37 and a consequent swing of the lever 35 will operate the gearing so as to adequately depress the plunger C.

It is pointed out that if the driver has his foot in engagement with the upper part of the shoe 37 and the throttle open as he would in ordinary driving, he is in position to immediately apply the brakes without moving his foot or locating the brake pedal, thus saving the fraction of time necessary to move his foot from the plunger C to the brake pedal B. By reason of the downward inclination of the shoe 37, it will be seen that as the brake pedal B is depressed, pressure of the driver's foot against the shoe is gradually released, thus permitting the throttle to be automatically closed when the brakes are applied. The brake can be freely used without the throttle attachment and the throttle attachment can be readily operated without applying the brakes.

One of the very important features and advantages of this invention is the ease of operation, which is due to the proportioning of the radii of the meshing elements of the gearing, as well as the relative spacing and location of the pivot points. The lever 18 is given sufficient length and the rack bar 25 is located at such a distance from the pivot point of said lever and the pinion is made of such diameter, that only a very slight swing of the lever will be required to rotate the pinion the necessary distance to obtain the required throw of the arm 23.

The pitman is connected to the arm at a distance from its pivot point, which will give the best results in both the travel of the pitman and the force required to operate the parts; it being obvious that moving the pivot point of the pitman along the arm 23 would cause a variation, not only in the travel of the pitman, but in the force necessary to swing the lever. Therefore, it is desirable to select a point of attachment in harmony with the radii of the meshing elements and the length of depression of the foot throttle, together with the force contemplated as necessary to operate the device. This also applies to the second form shown in Figures 8 to 12.

The pivoting of the levers 18 and 35 above the brake pedal is an important feature. If the operating lever is pivoted below the top of the brake pedal, as has been the practice in the prior art, the operation of such a lever becomes more difficult as the pedal is depressed and the driver's foot comes nearer to the pivot point of said lever. When the pivot point of the lever is placed above the brake pedal, the driver's foot moves further away from the pivot point as the pedal is depressed, thereby increasing the leverage and making the operation easier.

The description which has been given recites more or less detail of a particular embodiment of the invention, which is set forth as new and useful, however, I desire it understood that the invention is not limited to such exact details of construction, because it is manifest that changes and modifications may be made without departing from the spirit of the invention.

What I claim and desire to secure by Letters Patent, is:

1. In an auxiliary throttle attachment for motor vehicles, a support for attachment to the vehicle, a lever pivoted on the support above the brake pedal, said lever extending downward alongside and at an angle to the plane of said pedal, a gearing mounted on the support, a connection between the lever and the gearing, and means actuated by the gearing for connection with the foot throttle of a motor vehicle for operating the same.

2. In an auxiliary throttle attachment for motor vehicles, a bracket having a clamp, a lever pivoted on the bracket, a shoe carried by the lever, a segmental gear mounted on the bracket, an operating connection between the segmental gear and the lever, a pinion mounted on the bracket and in mesh with the gear, an arm attached to the pinion, and a link connected to the arm and having means for attachment to a foot throttle.

3. In a foot throttle for motor vehicles, a brake pedal, a support, a lever pivoted to the support above the brake pedal, said lever extending downward alongside and at an angle to the plane of said pedal, a throttle operating member, and a gearing interposed between the lever and the operating member and connected therewith.

4. In a foot throttle for motor vehicles, the combination with the brake pedal, of a support for attachment to the vehicle, a lever pivoted to the support above the brake pedal and extending downward alongside and at an angle to the plane of said pedal, an upright shoe carried by the lever positioned in juxta-position to and at one side of the brake pedal and operated by the operator's foot while upon the pedal, a connection for attachment to the vehicle throttle, and means arranged and operated by the lever for actuating the connection to operate the throttle with an increased amplitude as compared with the movement of the shoe, whereby only a slight lateral movement of the operator's foot is required to actuate the throttle.

5. In a foot throttle for motor vehicles, the combination with the brake pedal, of a support arranged to be attached to the vehicle, a lever pivoted to the support above the brake pedal and extending downward alongside and at an angle to the plane of said pedal, a shoe carried by the lever in juxta-position to the side of the pedal, a throttle actuating member for attachment to the throttle, and operating means connected with the lever and the member for operating said member when the lever is swung and arranged to amplify the movement imparted to the lever, whereby a slight movement of the shoe will impart a greater movement to the member.

6. In a foot throttle attachment for motor vehicles, a support, an elongated lever pivoted at one end to the support, a shoe carried by the other end of the lever whereby when the support is mounted above the brake pedal the shoe may be located at one side of the pedal, a fulcrum bracket, an arm pivoted on the bracket, a pinion secured to the arm around its pivot, a rack bar carried by the lever and engaging the pinion, and a pitman pivoted to the arm and having means at its free end for attaching to a foot throttle.

7. In a foot throttle for motor vehicles, the combination with the brake pedal, of a support arranged to be attached to the vehicle, a lever pivoted to the support above the brake pedal and extending downward alongside and at an angle to the plane of said pedal, a shoe mounted on the lever in juxta-position to the side of the pedal and having its face inclined downwardly and away from said pedal, whereby the lever and shoe may swing toward the pedal when the latter is depressed with the operator's foot in engagement with the shoe, a throttle actuating member for attachment to the throttle, and operating means connected with the lever and the member for operating said member when the lever is swung and arranged to amplify the movement imparted to the lever, whereby a slight lateral movement of the shoe will impart a greater movement to the member.

8. In a foot throttle for motor vehicles, a clamp arranged to be attached to a steering post, a fulcrum bracket arranged to be attached to a steering post, an elongated lever pivoted at one end to the clamp, a broad faced shoe carried by the other end of the lever, an arm pivoted on the bracket, a pinion fastened to the arm around its pivot, a rack bar fastened on the lever intermediate its ends and engaging the pinion, and a pitman having one end pivoted to the arm and its other end provided with means for attaching to a foot throttle.

9. A foot throttle for motor vehicles, comprising a support having means whereby it may be attached to the steering post of a motor vehicle above the brake pedal, a lever pivoted on the support extending downward alongside the brake pedal and in the general direction of the steering post when the support is mounted on the steering post, said lever having an operating shoe near its free end for engagement by the driver's foot, a throttle operating member, and means for transmitting motion and amplifying said motion from the lever to the member.

10. In a foot throttle for motor vehicles, the combination with a brake pedal, of a support for attachment to a vehicle, an operating lever pivoted above the pedal and extending downward alongside and at an angle to the plane of said pedal, a shoe on the lower end of the lever in juxta-position to the brake pedal so as to be engaged by the driver's foot while resting on said pedal, a throttle actuating member, and means for transmitting motion from the lever to the member, the shoe having an inclined face for overhanging the pedal, whereby when the driver's foot is resting on said pedal and engaging the shoe, the throttle will be closed upon the depression of said pedal and opened upon the release of said pedal, all without shifting of the driver's foot on said pedal.

11. In a foot throttle for motor vehicles, the combination with a brake pedal, of a support attached to the vehicle above the brake, an operating lever pivoted to the support and extending downward alongside and at an angle to the plane of the brake pedal, a throttle actuating member, means interposed between the lever and member for transmitting and amplifying motion from the operating member to the actuating lever, and a shoe mounted on the operating lever and having an inclined face overhanging the brake pedal, whereby when the driver's foot is resting on said pedal in engagement with the face of said shoe, the operating lever will be automatically swung both upon the depression of the pedal as well as upon its return.

12. In a foot throttle for motor vehicles, a support for attachment to a motor vehicle, a lever, a pinion mounted on the support, a gear segment connected with and actuated by the swing of the lever, the segment having a considerably greater radius than the pinion, an arm connected with and swung by the pinion, a throttle actuating member pivoted to the arm, and a shoe attached to the lever adjacent one end thereof, whereby a swing of the lever by displacement of the shoe causes an amplified swing of the arm.

13. In a foot throttle for motor vehicles, a support for attachment to a motor vehicle, a lever, a pinion mounted on the support, a gear segment connected with and actuated by the swing of the lever, the segment having a considerably greater radius than the pinion, an arm connected with and swung by the pinion, a throttle actuating member pivoted to the arm, and a shoe attached to the lever adjacent one end thereof, whereby a swing of the lever by displacement of the shoe causes an amplified swing of the arm, the shoe having its face disposed at an inclination.

14. A foot throttle for motor vehicles, comprising a support having means whereby it may be attached to the steering post of a motor vehicle above the brake pedal, a lever pivoted on the support extending downward and at an angle to the plane of the pedal when the support is mounted on the steering post, said lever having an operating shoe located alongside the pedal for engagement by the driver's foot, a throttle operating member, and means for transmitting motion from the lever to the member.

15. In a foot throttle for motor vehicles, a brake pedal, a support, a lever pivoted to the support above the brake pedal, said lever extending downward and intersecting the plane of the pedal, a shoe mounted on the lever and located adjacent the pedal, a throttle operating member, and a gearing interposed between the lever and the operating member and connected therewith.

16. A foot throttle for motor vehicles, comprising a support having means whereby it may be attached to the steering post of a motor vehicle above the brake pedal, a lever pivoted on the support extending downward adjacent and intersecting the plane of the brake pedal when the support is mounted on the steering post, for engagement by the driver's foot, a throttle operating member, and means for transmitting motion from the lever to the member.

17. In a foot throttle for motor vehicles, a brake pedal, a support, a lever pivoted to the support above the brake pedal, said lever extending downward and intersecting the plane of the pedal, a shoe mounted on the lever located alongside and inclined downward and outward from the pedal, a throttle operating member, and a gearing interposed between the lever and the operating member and connected therewith.

In testimony whereof I affix my signature.

LOUIS JACOBY.